May 12, 1959   F. W. KELLEY, JR   2,886,769
SATURABLE REACTOR CIRCUITS
Filed May 31, 1955
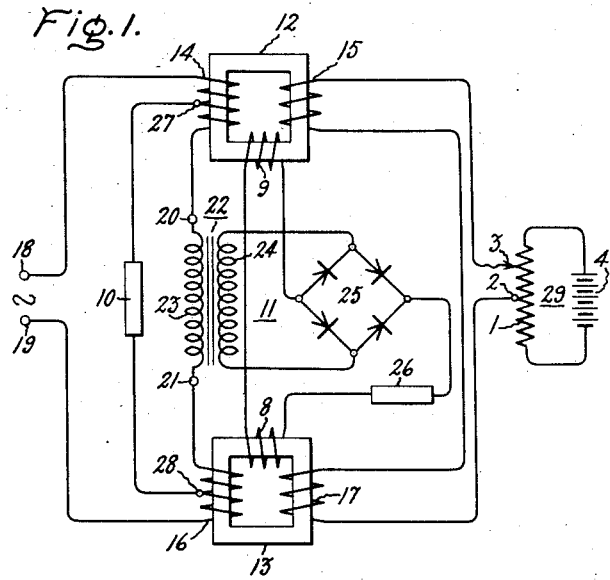
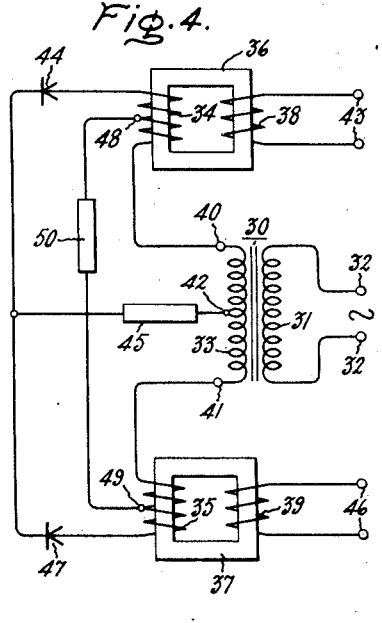
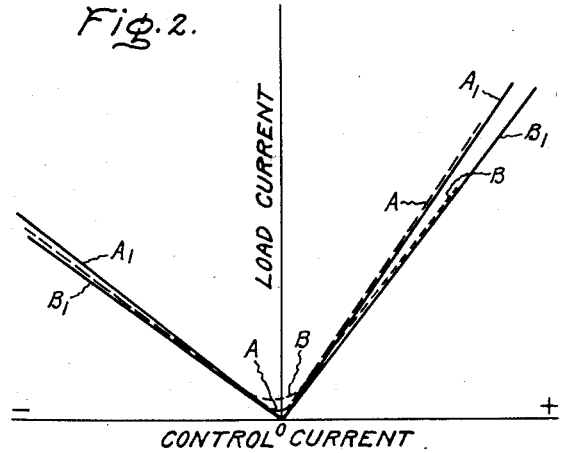
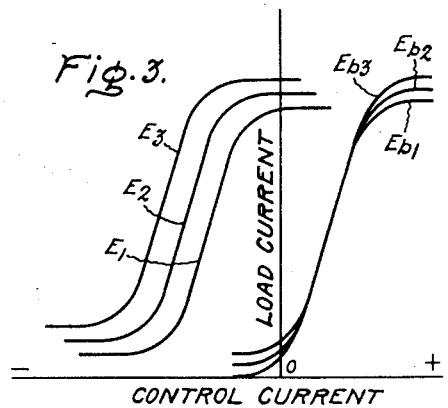
Inventor:
Fred W. Kelley, Jr.,
by Merton D. Moore
His Attorney.

United States Patent Office 2,886,769
Patented May 12, 1959

2,886,769
SATURABLE REACTOR CIRCUITS

Fred W. Kelley, Jr., Scotia, N.Y., assignor to General Electric Company, a corporation of New York Application May 31, 1955, Serial No. 512,085

9 Claims. (Cl. 323—89)

This invention relates to saturable core impedance devices and, more particularly, to such devices known as magnetic amplifiers wherein the output of the device is controlled by controlling the saturation of the core or cores employed.

The field of application of saturable core impedance devices, such as the ones contemplated herein, has been limited both by the fact that variations in supply voltage cause variations in load current, and by the fact that the control exerted on the output current by the control windings of the device is not linear over a desired range. That is to say, that the load current cannot be varied linearly with the control current in the particular range of control currents available for some applications and the load current does not vary linearly with control current over a range which is sufficiently broad for many applications. It has been particularly difficult to obtain a saturable core impedance device wherein the load current is reduced to zero for zero control current. Normally, the output current cannot be reduced to zero when the signal current is zero since a certain amount of exciting current must flow to supply core losses (including eddy current and hysteresis losses). Since this range near zero output current when the load current will not vary linearly with the signal or control current occurs due to the exciting current which must flow, it is referred to as the exciting current error in the load or measuring circuit. It will readily be seen that in such applications as direct current measuring reactors, it is highly desirable to extend the linear range of operation down to zero control current and zero output current. If such measuring reactors are to be utilized for measuring currents in both the positive and negative senses, it is even more important to extend the linear range of operation down to the zero point.

Accordingly, it is an object of this invention to provide a saturable core impedance device wherein the exciting current error in the load circuit is reduced to a minimum.

Another object of this invention is to provide means for minimizing the effect of supply voltage variations on the load current and extending the linear range of saturable core impedance devices.

Briefly stated, in accordance with this invention, the exciting current error in the load circuit of saturable core impedance devices is substantially eliminated by providing a current path which represents a short circuit to the normal excitation current of the device and which path represents substantially an open circuit to other currents in the load or gate windings of the device. This is accomplished by providing an impedance having certain charactertistics between taps on each of the load windings of certain saturable core impedance devices. Thus, for a magnetic circuit without feedback, the exciting current error in the load circuit is reduced and the linear range of the circuit is extended. For a magnetic circuit with feedback, the regenerated exciting current is reduced and thus the exciting current bias is reduced and the linear operating range is extended. In either case, the effect of supply voltage variations on the load current is minimized.

The novel features which are believed to be characteristic of this invention are set forth with particularity in the appended claims. This invention, however, both as to its organization and method of operation, together with further objects and advantages thereof, may best be understood by reference to the following description taken in connection with the accompanying drawing, in which:

Figs. 1 and 4 diagrammatically illustrate circuits embodying the invention, and Figs. 2 and 3 graphically represent certain operating characteristics of the circuits of Figs. 1 and 4.

Referring particularly to Fig. 1, a magnetic amplifier circuit is diagrammatically represented, which circuit utilizes a bleeder impedance 10 to bypass a portion of the exciting current of a saturable core impedance device from a load circuit 11. The saturable core impedance device utilizes a pair of core members 12 and 13. The core member 12 is provided with a main or gate winding 14 which carries the load current, a control or signal winding 15 which controls the saturation of the core 12 in accordance with the ampere turns supplied to the control winding, and a feedback winding 9 which carries output current of the device. In a like manner, the magnetic core member 13 is provided with a load current carrying main or gate winding 16, a control or signal winding 17 for determining the saturation of the core 13 in accordance with a control signal and a feedback winding 8 which carries output current of the device.

As illustrated, the main windings 14 and 16 of the saturable core impedance device are energized by connecting an alternating current voltage source to the input terminals 18 and 19 of the main windings 14 and 16 respectively and a load circuit 11 is connected between the main winding output terminals 20 and 21. The load circuit utilized in the embodiment of Fig. 1 consists of an isolation transformer 22 having its primary winding 23 connected between the output terminals 20 and 21 to be energized by the output or load current of the saturable core impedance device and its secondary windings 24 connected across the input terminals of a full wave bridge rectifier 25. A load impedance 26 is connected in series with the two feedback windings 8 and 9 across the output terminals of the full wave bridge rectifier 25 to receive a direct current which is proportional to the magnitude of the output or load current of the saturable core impedance device. In this manner the feedback windings 8 and 9 add a flux to their respective core members 13 and 12 which is a function of output current.

In order to provide a bypass for at least a portion of the exciting current of the saturable core impedance device, the bleeder impedance 10 is connected between taps 27 and 28 on the main windings 14 and 16, respectively.

The operation of the circuit of Fig. 1 may best be understood by reference to the characteristic curves of Fig. 2 wherein the load current as, for example, the current flowing in load impedance 26 is plotted against control current flowing in the control windings 15 and 17 for several different magnitudes of load impedance 26 in the circuit of Fig. 1 both with and without the bleeder impedance 10 connected between taps 27 and 28 on the main windings 14 and 16 respectively. To obtain characteristic curves of Fig. 2 the control windings 15 and 17 on the cores 12 and 13 respectively were connected in series with each other across a common variable direct current source 29. The variable direct current source illustrated comprises a potentiometer 1 having a fixed center tap 2 and a variable tap 3 between which the series connected control windings 15 and 17 are connected. A voltage is supplied across the potentiometer by a battery 4 or other suitable source. It will be noted that the sense of the voltage across the control windings 15 and 17 may be reversed by sliding the variable tap 3 from one end of the potentiometer 1 to the opposite end. For example, by sliding the tap 3 from the upper end of potentiometer 1 to the lower end thereof.

The broken line curve A was obtained using a given load impedance and no bleeder impedance. From this curve (curve A), it will readily be seen that the load current varies linearly with the control current over the major portion of the operating range for both positive and negative control currents. However, it will be seen that in the region near the zero control current axis, load current flows even though there is no control current. As previously explained, this error or non-linearity is an exciting current error. It will also be seen from an inspection of this curve that such a non-linear region would be highly undesirable for certain applications. If, for example, a meter were utilized in the load circuit to measure a current flowing in the control windings, the non-linear region between the switch over from positive to negative control current would cause considerable error in the meter reading. Obviously, such an error is undesirable and for some applications cannot be tolerated.

The solid line curve $A_1$ shows the characteristic of the circuit utilizing the same load impedance as was used to obtain the broken line curve A but with the addition of the bleeder impedance 10. It will be seen from the characteristic curve $A_1$ that the use of the bleeder impedance 10 linearizes the characteristic over substantially the entire range, i.e. the load current is reduced to substantially zero when the control current is zero.

The dotted line curve B was taken with the circuit of Fig. 1 without the bleeder impedance and with a load impedance approximately eight times the value of the load impedance utilized to obtain the characteristic curves A and $A_1$. Once again, it will be seen that a non-linear region exists near the zero control current axis. The solid line characteristic curve $B_1$ was plotted using measurements from the same circuit which was utilized to obtain the characteristic curve B except that the bleeder impedance 10 was connected as shown in Fig. 1. Once again, the bleeder impedance linearizes the characteristic over the entire range of control currents.

The bleeder impedance 10 will not be effective if the taps 27 and 28 are selected in such a manner that the series circuit which includes the bleeder impedance 10 and the alternating current supply source does not include any turns of the main windings (i.e. zero percent taps) or if the aforementioned series circuit contains all of the turns of both main windings (i.e. one hundred percent taps). However, if the taps are selected at any other points on the main windings the bleeder impedance 10 will be effective as far as linearizing the characteristics of the saturable core impedance device. Since minimum power will be dissipated by the bleeder impedance circuit if the taps 27 and 28 are brought out half way between the end points of their respective main windings, 14 and 16 (i.e. fifty percent taps), this is the preferred arrangement for most cases.

An inspection of the characteristics of Fig. 2 and the circuit of Fig. 1, and the close relationship between the curves A and $A_1$ and B and $B_1$ indicates that the bleeder impedance 10 has little or no effect on the load current for values outside of the non-linear region caused by the exciting current error. As a consequence, it may be deduced that the bleeder impedance 10 in effect acts as a short circuit for exciting current and is essentially an open circuit with respect to normal load current. The optimum results are obtained by the proper matching of the bleeder impedance to the main winding impedances looking into the taps 27 and 28 of the main windings 14 and 16 respectively. For example, in the circuit of Fig. 1, the main windings 14 and 16 are inductive. As a consequence, the bleeder impedance should be inductive and the iron of the bleeder inductance should be made to match the iron of the magnetic circuit as closely as possible. In many cases, even if the bleeder impedance is made resistive, its effects are of sufficient magnitude to warrant its use.

Under normal operating conditions, exciting current error is augmented by a regenerated exciting current and, consequently, exciting current error is normally greater for magnetic amplifier circuits using regenerative feedback. That is to say, that if an extra set of windings were added to each of the cores 12 and 13, and if each of these windings were connected to be regeneratively energized from the load circuit, the exciting current which normally flows in a magnetic circuit which does not utilize a bleeder impedance would be supplied back to increase the error in the load. It has been found that for such an arrangement, the regenerated exciting current is minimized due to the fact that the exciting current in the load is substantially eliminated. The output characteristic of such a circuit with bleeder impedances is similar to the solid line curves $A_1$ and $B_1$ of Fig. 2.

The characteristic curves of Fig. 3 show the relations of load current plotted as ordinates to control current plotted as abscissa over a more extended range and for various values of supply voltage. The curves $E_1$, $E_2$, and $E_3$ illustrate the characteristics of a saturable core impedance device such as the device of Fig. 1 with three different supply voltages, the voltages increasing as the subnumerals increase. That is to say, that as the supply voltage is increased, the characteristic curve of load current versus control current is shifted to the left and upward on the plot of control current versus load current and for most magnetic materials is always partially or completely on the negative side of the zero control current axis (when unsaturated, in the positive direction) unless a bias is applied to the magnetic core.

The characteristic curves $E_{B1}$, $E_{B2}$, and $E_{B3}$ represent the characteristic curves utilizing a bleeder impedance in the circuit of Fig. 1 with the supply voltages $E_1$, $E_2$, and $E_3$ respectively. As may be seen from different sets of characteristic curves, the use of the bleeder impedance effectively adds a bias to the saturable core impedance device since it shifts the characteristic curves to the right. It may also be seen from the characteristic curves of Fig. 3 that the curves for different supply voltages are not shifted to the left by an equal amount but are shifted upwardly and portions of each curve coincide with each other so that for a considerable portion of the characteristic curves, a variation in supply voltages will not cause a change in load current. Thus, the use of the bleeder impedance not only reduces the exciting current error in magnetic circuits without feedback and minimizes both the exciting current error and the exciting current bias in circuits with feedback, but also minimizes the effect of supply voltage variations on the load current in either type of circuit.

The bleeder impedance is equally applicable to a full wave (bi-phase) magnetic amplifier circuit. Fig. 4 illustrates such an arrangement. In the magnetic amplifier circuit of Fig. 4, a supply transformer 30 is provided which has its primary winding 31 connected across an alternating current source 32 and its center tapped secondary winding 33 connected to the input terminals of a pair of main or gate windings 34 and 35 of the magnetic amplifier. A pair of cores 36 and 37 make up the "iron" of the magnetic circuit and have the main windings 34 and 35 wound thereon. The individual cores 36 and 37 are also provided with individual control windings 38 and 39 respectively for receiving a control signal and for controlling the saturation of the cores in response thereto. The control signal terminals 43 and 46 are provided for the application of the signal to the control windings 38 and 39 respectively. In order to obtain characteristic curves similar to those of Figures 2 and 3, the control signal terminals 43 and 46 can be connected to a variable voltage direct current source such as the source 29 illustrated in Fig. 1.

A series circuit is connected between each end terminal 40 and 41 of the transformer secondary winding 33 and its mid tap 42. The series circuit connected between the upper end tap 40 and the mid tap 42 comprises the main winding on the upper core, a unidirectional device 44, such as selenium or silicon rectifier, and load impedance 45. The series circuit which is connected between the lower end tap 41 of the input transformer secondary winding and its mid tap 42 consists of the main winding 35 on the lower core 37, a unidirectional conductive device 46, and the load impedance 45. The unidirectional conductive devices 44 and 47 are poled similarly in such a manner that current flows through alternate main windings on alternating half cycles of the alternating current source. In other words, the magnetic amplifier circuit of Fig. 4 as described to this point is a conventional full wave bi-phase circuit which suffers from the defects of other magnetic amplifier circuits as previously set forth, i.e., exciting current error and voltage instability.

In accordance with my invention, windings 34 and 35 are provided with taps 48 and 49 respectively and a bleeder impedance 50 is connected directly between these taps. The characteristics of this circuit are similar to those shown in Figs. 2 and 3 and, consequently, it will be seen that the use of the bleeder impedance in this circuit minimizes the exciting current error and the effect of supply voltage variations on the load current.

It will be obvious from a study of the principles described herein that the present invention could be applied to other circuits. For example, it will be understood that the bleeder impedance could be utilized in polyphase circuits.

While the invention has been described by reference to particular embodiments thereof, it will be understood that numerous changes may be made by those skilled in the art without actually departing from the invention. It is, therefore, the aim to cover all such equivalent variations as come within the true spirit and scope of the forecoming disclosure in the appended claims.

What I claim as new and desire to secure by Letters Patent of the United States is:

1. A magnetic amplifier comprising at least a pair of core members, a main winding and a control winding on each of said core members, said main windings being connected to be energized from an alternating voltage source and to supply a load device, said main windings each having an input terminal at one end thereof for connection to said voltage source and an output terminal at the other end thereof for connection to said load device, at least one tap intermediate the ends of each of said main windings, and a bleeder impedance entirely magnetically independent of said main windings connected between the taps on said main windings.

2. A saturable core impedance device comprising at least a pair of core members, a main winding and a control winding on each of said core members, each of said main windings having an input terminal and an output terminal connected thereto at spaced apart points thereof, and at least one tap intermediate said input and output terminals, each of said input terminals being connected to receive a supply voltage, said output terminals being connected to supply a load device, and a bleeder impedance means entirely magnetically independent of said main windings connected between said taps on said main windings.

3. A magnetic amplifier comprising at least a pair of core members, a main winding and a control winding on each of said core members, each of said main windings having an input terminal and an output terminal connected respectively to the opposite ends thereof, and at least one tap intermediate said input and output terminals, each of said input terminals being connected to receive a supply voltage, said output terminals being connected to supply a load device, and a bleeder impedance means entirely magnetically independent of said main windings connected between said taps on said main windings.

4. A magnetic amplifier comprising at least a pair of core members, a main winding and a control winding on each of said core members, each of said main windings having an input terminal and an output terminal connected thereto at spaced apart points thereof, and at least one tap intermediate said input and output terminals, each of said input terminals being connected to receive a supply voltage, a load device connected between said output terminals, and a bleeder impedance means entirely magnetically independent of said main windings connected between said taps on said main windings, said load device comprising a load transformer having input and output windings, and a full wave bridge rectifier having input and output terminals, said full wave bridge rectifier having its input terminals connected to be energized from the secondary winding of said load transformer and its output terminals connected to supply a load impedance.

5. A magnetic amplifier comprising at least a pair of core members, a main winding and a control winding on each of said core members, each of said main windings having an input terminal and an output terminal connected respectively to the opposite ends thereof, and at least one tap intermediate said input and output terminals, each of said input terminals being connected to receive a supply voltage, a load device connected between said output terminals, and a bleeder impedance means entirely magnetically independent of said main windings connected between said taps on said main windings, said load device comprising a load transformer having input and output windings, a full wave bridge rectifier having input and output terminals, said full wave bridge rectifier having its input terminals connected to be energized from the secondary winding of said load transformer and its output terminals connected to supply a load impedance.

6. A magnetic amplifier comprising at least a pair of core members, a main winding and a control winding on each of said core members, each of said main windings having an input terminal and an output terminal connected thereto at spaced apart points thereof, and at least one tap intermediate said input and said output terminals, each of said input terminals being connected to receive a supply voltage, said output terminals being connected to supply a load device, and a bleeder impedance means entirely magnetically independent of said main windings connected between said taps on said main windings, said load device comprising a load transformer having input and output windings, a rectifier, and a pair of load terminals to be connected to a load impedance, said rectifier being connected to said transformer output winding and said load terminals to supply a unidirectional potential between said terminals.

7. A magnetic amplifier comprising at least a pair of core members, a main winding and a control winding on each of said core members, each of said main windings having an input terminal and an output terminal connected respectively to the opposite ends thereof, and at least one tap intermediate said input and output terminals, each of said input terminals being connected to receive a supply voltage, a load device connected between said output terminals, and a bleeder impedance means entirely magnetically independent of said main windings connected between said taps on said main windings, said load device comprising a load transformer having input and output windings, a rectifier, and a pair of load terminals to be connected to a load impedance, said rectifier being connected to said transformer output winding and said pair of load terminals to supply a unidirectional potential between said load terminals.

8. In combination, a three terminal source of alternating voltage having a central zero voltage terminal, a magnetic amplifier, and a pair of load terminals, said magnetic amplifier comprising at least a pair of core members, a main winding and a control winding on each of said core members, each of said main windings having an input terminal, an output terminal, and at least one tap intermediate thereof, a bleeder impedance means connected between said taps on said main windings, and individual saturating rectifiers connected to each output terminal of said main winding and in series circuit relation with each main winding, said rectifiers being similarly poled to provide current flow in each of said main windings on alternate half cycles of said alternating current source, the input terminals of said main windings being connected to opposite end terminals of said voltage source, and said pair of load terminals being connected between said central zero voltage terminal and said rectifiers whereby a load device connected between said pair of load terminals receives a unidirectional current.

9. A magnetic amplifier circuit comprising a transformer adapted to be connected to an alternating current source and having a center tapped secondary winding, individual series circuits connected from each side of said transformer secondary to said center tap, said series circuits comprising a main reactance winding, a unidirectional conducting device, and a pair of load terminals to be connected to a load impedance, said load terminals being common to each of said series circuits, a tap on each of said main reactance windings, and a bleeder impedance connected between the taps on said main reactance windings.

References Cited in the file of this patent

UNITED STATES PATENTS

| | | |
|---|---|---|
| 2,373,383 | Christopher | Apr. 19, 1945 |
| 2,468,878 | Huge | May 3, 1949 |
| 2,644,129 | Ramey | June 30, 1953 |
| 2,754,473 | Hooper | July 10, 1956 |

FOREIGN PATENTS

| | | |
|---|---|---|
| 66,432 | Norway | July 5, 1943 |

OTHER REFERENCES

Publication, The Transductor Amplifier, by Ulrik Krabbe, pp. 69–71, 1947.

UNITED STATES PATENT OFFICE
CERTIFICATE OF CORRECTION

Patent No. 2,886,769                                            May 12, 1959

Fred W. Kelley, Jr.

It is hereby certified that error appears in the printed specification of the above numbered patent requiring correction and that the said Letters Patent should read as corrected below.

Column 6, line 61, after "said" insert -- load --.

Signed and sealed this 6th day of October 1959.

(SEAL)
Attest:

KARL H. AXLINE                                                ROBERT C. WATSON
Attesting Officer                                           Commissioner of Patents